United States Patent [19]

Sommers

[11] 4,287,154

[45] Sep. 1, 1981

[54] SPECIMEN TRANSFER RACK

[76] Inventor: Philip B. Sommers, 923 Garden Rd., Orange, Conn. 06477

[21] Appl. No.: 147,616

[22] Filed: May 7, 1980

[51] Int. Cl.$^3$ ........................ G01N 21/01; G01N 1/10

[52] U.S. Cl. ........................................ 422/64; 422/67; 422/104

[58] Field of Search ..................... 422/64, 65, 67, 102, 422/104

[56] References Cited

U.S. PATENT DOCUMENTS

| | | | |
|---|---|---|---|
| 3,567,393 | 3/1971 | Welch | 422/64 |
| 3,705,788 | 12/1972 | Kolko et al. | 422/104 |
| 3,948,606 | 4/1976 | Johnson | 422/104 |

*Primary Examiner*—Ronald Serwin
*Attorney, Agent, or Firm*—William W. Jones

[57] ABSTRACT

The rack is provided with means for supporting and temporarily holding in place the portion of a specimen analyzing device in which a plurality of biological or other fluid specimens to be analyzed is contained. The specimen containing portion of the analyzing device may take the form of a circular carousel with the specimen samples being contained in a plurality of holding tubes arranged equiangularly about the circumference of the carousel. The rack is provided with a plurality of bulk specimen tubes which are releasably held in the rack in a circular array about the carousel so that each bulk specimen tube is disposed radially opposite to a corresponding specimen holding tube in the carousel. In this manner, specimen samples may be transferred from the bulk specimen tubes to the specimen holding tubes without any confusion as to which bulk tube is paired with which holding tube.

7 Claims, 3 Drawing Figures

SPECIMEN TRANSFER RACK

This invention relates to a rack for use in transferring biological or other fluid specimens from a plurality of tubes or other holders containing bulk amounts of such specimens to a plurality of tubes used in a specimen analysis apparatus or instrument. More particularly, the rack of this invention is designed for use in transferring specimens to a holder part of the analysis instrument which holder part is generally circular and has specimen containing receptacles disposed equiangularly about its circumference.

There are a number of specimen analyzing instruments in use in medical testing laboratories in which the specimen samples to be analyzed, such as serum or plasma, are held in a plurality of receptacles disposed equally about the perimeter of a generally circular part of an analyzing instrument. Representative of such instruments is the ABA-100 bichromatic analyzer manufactured by Abbott Laboratories. Additional similar instruments are centrifugal analyzers which utilize specimen cups disposed about the perimeter of a rotor and continuous flow analysis equipment produced by Technicon Corporation.

As noted above, each of the enumerated instruments utilizes a generally circular specimen holder which supports a plurality of specimen receptacles disposed equiangularly about the periphery of the specimen holder. The specimen holder may be removed from the instrument in each case for cleaning and for receiving the specimen samples in the receptacles.

A problem which has arisen in connection with the filling of the receptacles with specimen samples relates to the ability of the lab technician to accurately correlate, as simply as possible, the specimens in the analyzer receptacles with the specimens in the source test tubes. In this connection, the technician will utilize a plurality of source test tubes in which bulk supplies of the fluid being tested will be contained. For example, if the technician is analyzing biological fluids from thirty different patients, there will be thirty different test tubes, each having a bulk supply of the biological fluid being tested from one particular patient. These bulk supply test tubes will characteristically be held in a test tube rack, typically rectilinear, having columns of rows of test tubes therein. In view of the specimen transfer operation which occurs between the rectilinear arrangement of bulk specimen tubes and the circular arrangement of analyzer specimen receptacles, there exists a substantial possibility of error in correlating the bulk specimen tubes with the analyzer specimen receptacles. Thus, errors in properly equating the bulk specimen tube to the equivalent analyzer specimen receptacle can and do occur.

This invention is directed to the provision of a specimen transfer rack which will positively prevent the occurrence of such specimen correlation errors. The rack of this invention includes a central portion, such as a recess or the like, which is adapted to receive and support the generally circular part of the analyzer instrument, which circular part holds the specimen receptacles equiangularly spaced about its periphery. Arrayed equiangularly about the central portion of the rack, there is disposed a plurality of specimen tube holders, into which the individual bulk specimen tubes can be placed. The specimen tube holders are spaced so that there is a specimen tube holder spaced radially opposite each specimen receptacle in the circular part of the analyzing instrument when the circular part is positioned on the central part of the rack. Thus for each specimen receptacle on the analyzer, there will be a corresponding bulk specimen tube directly opposite and paired therewith on the rack. The specimen samples are thus transferred from the bulk specimen tubes to the specimen receptacles with the positioning and pairing of the respective tubes and receptacles making the possibility of an error in transfer virtually impossible. Furthermore, the receptacles and the specimen tube holders can each be serially numbered so that matching number sets can be utilized to further reduce the possibility of error.

It is, therefore, an object of this invention to provide a specimen transfer rack which has provisions for supporting a generally circular part of an analyzing instrument and provisions for supporting a plurality of bulk specimen tubes to facilitate transfer of specimen samples from the specimen tubes to specimen receptacles on the supported part of the instrument.

It is a further object of this invention to provide a specimen transfer rack of the character described wherein the specimen receptacles are equiangularly spaced about the periphery of the circular part of the analyzing instrument, and the bulk specimen tubes are disposed in a circular array of specimen tube holders radially outwardly of the periphery of the circular part.

It is yet another object of this invention to provide a specimen transfer rack of the character described wherein the specimen tube holders are each paired with a respective one of the specimen receptacles so that the chance of error in correlating specimen tubes with specimen receptacles is virtually eliminated when the specimen samples are transferred.

These and other objects and advantages of the invention will become more readily apparent from the following detailed description of a preferred embodiment of the invention taken in conjunction with the accompanying drawings, in which.

Figure 1:
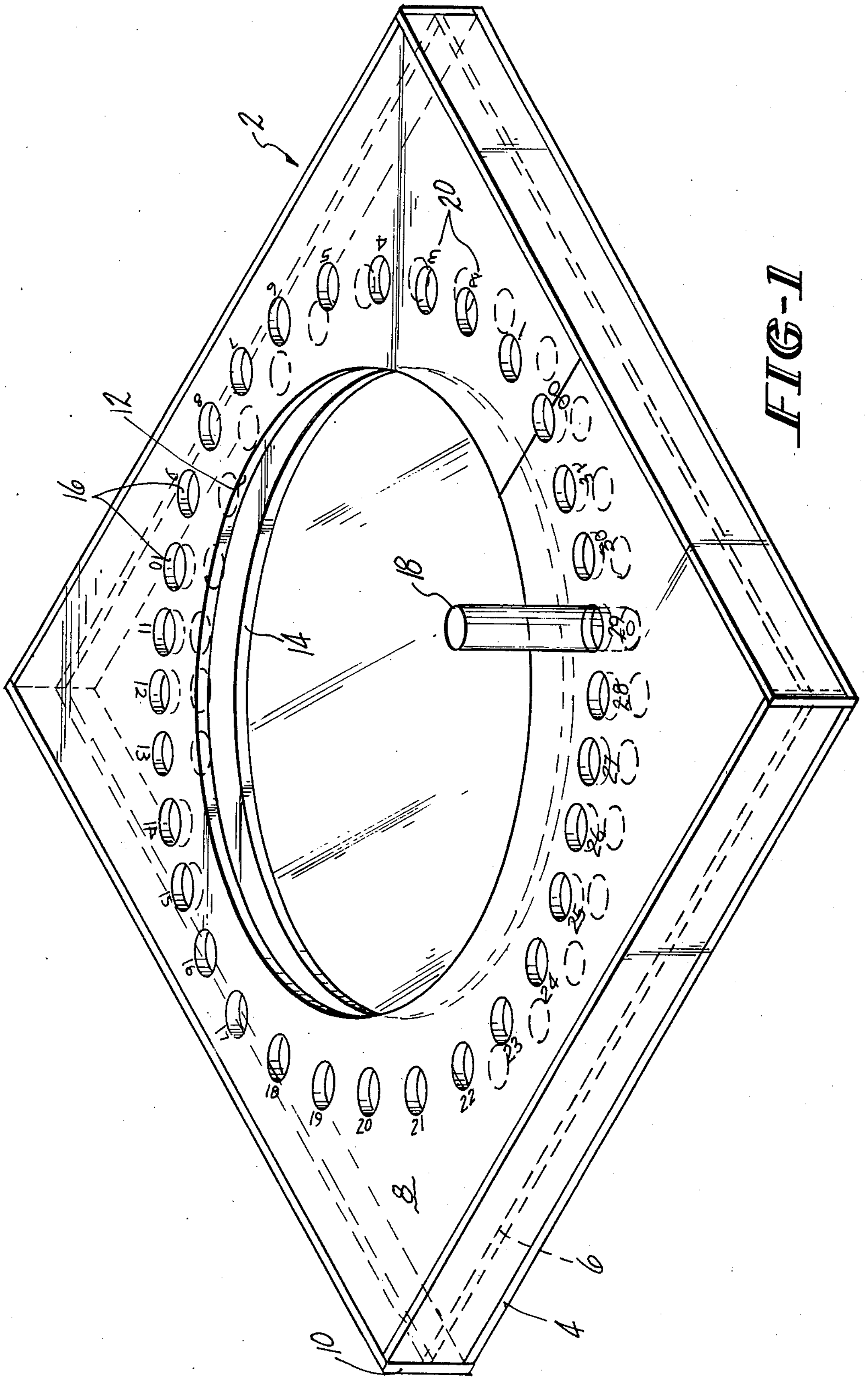
FIG. 1 is a perspective view of a preferred embodiment of a specimen transfer rack formed in accordance with this invention.

Referring now to the drawings, there is shown in FIG. 1 a preferred embodiment of a specimen transfer rack, denoted generally by the numeral 2, formed in accordance with this invention. The rack 2 shown in FIG. 1 is one specifically adapted to be used in conjunction with the circular part of the ABA-100 bichromatic analyzer manufactured by Abbott Laboratories, which circular part is called a carousel. The rack 2 includes a bottom plate 4 which rests upon a supporting surface, such as a lab bench, or the like, an intermediate plate 6, and an upper plate 8. Side plates 10 interconnect the bottom, intermediate, and upper plates 4, 6 and 8, respectively. A large circular opening 12 is centrally disposed through the upper plate 8, there being a like concentric circular opening 14 extending through the intermediate plate 6. The openings 12 and 14 are sized so as to receive the instrument carousel. A plurality of smaller openings 16 are disposed through the upper plate 8, the smaller openings 16 being equiangularly arranged about the circumference of the opening 12, and radially outwardly offset from the perimeter thereof. The smaller openings 16 are sized to receive and support bulk specimen test tubes 18, such as those normally used to collect serum or plasma. It will be noted that the bottoms of the bulk specimen test tubes 18 rest upon the top surface of the intermediate plate 6. Consecutive numerical indicia 20 may be displayed adjacent to the smaller openings 16 so that each opening 16 is numbered.

Figure 2:
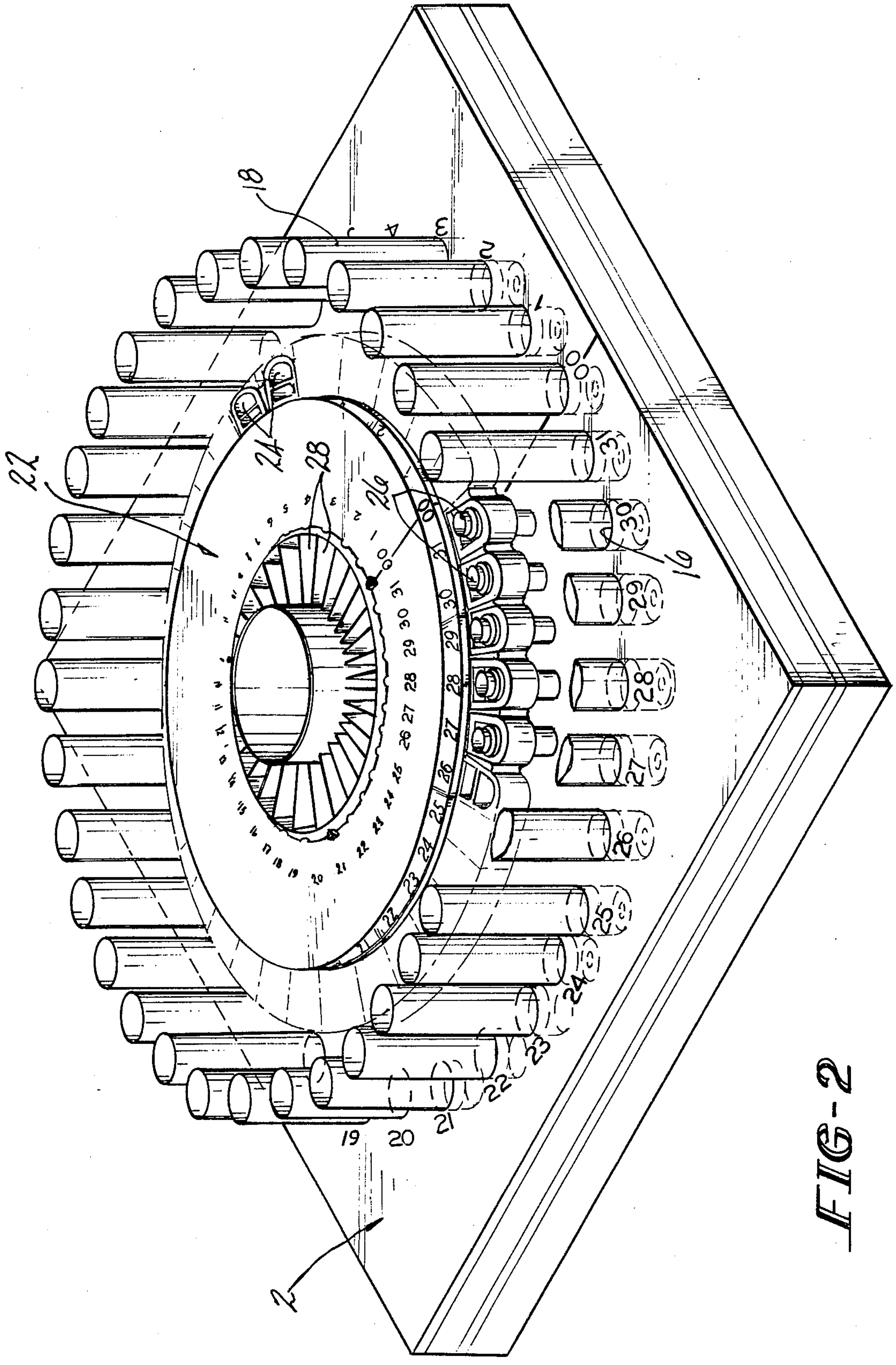
FIG. 2 is a perspective view of the rack of FIG. 1 showing the circular part of the analyzing instrument which holds the specimen receptacles seated on the transfer rack.

Referring now to FIG. 2, there is shown the rack 2 with a carousel 22 of the type forming a part of an ABA-100 bichromatic analyzer referred to above, disposed in the openings 12 and 14 of the rack 2. It will be noted that the periphery of the carousel 22 is formed with a plurality of equiangularly spaced through passages 24 which hold specimen receptacles 26. The receptacles 26 serve as reservoirs for specimen samples which are mechanically transferred to correlating cuvettes 28 arrayed about the central portion of the carousel 22. The carousel 22 is positioned in the rack 2 so that each receptacle 26 is aligned and paired with a respective specimen tube opening 16, and, therefore, a bulk specimen tube 18.

Figure 3:
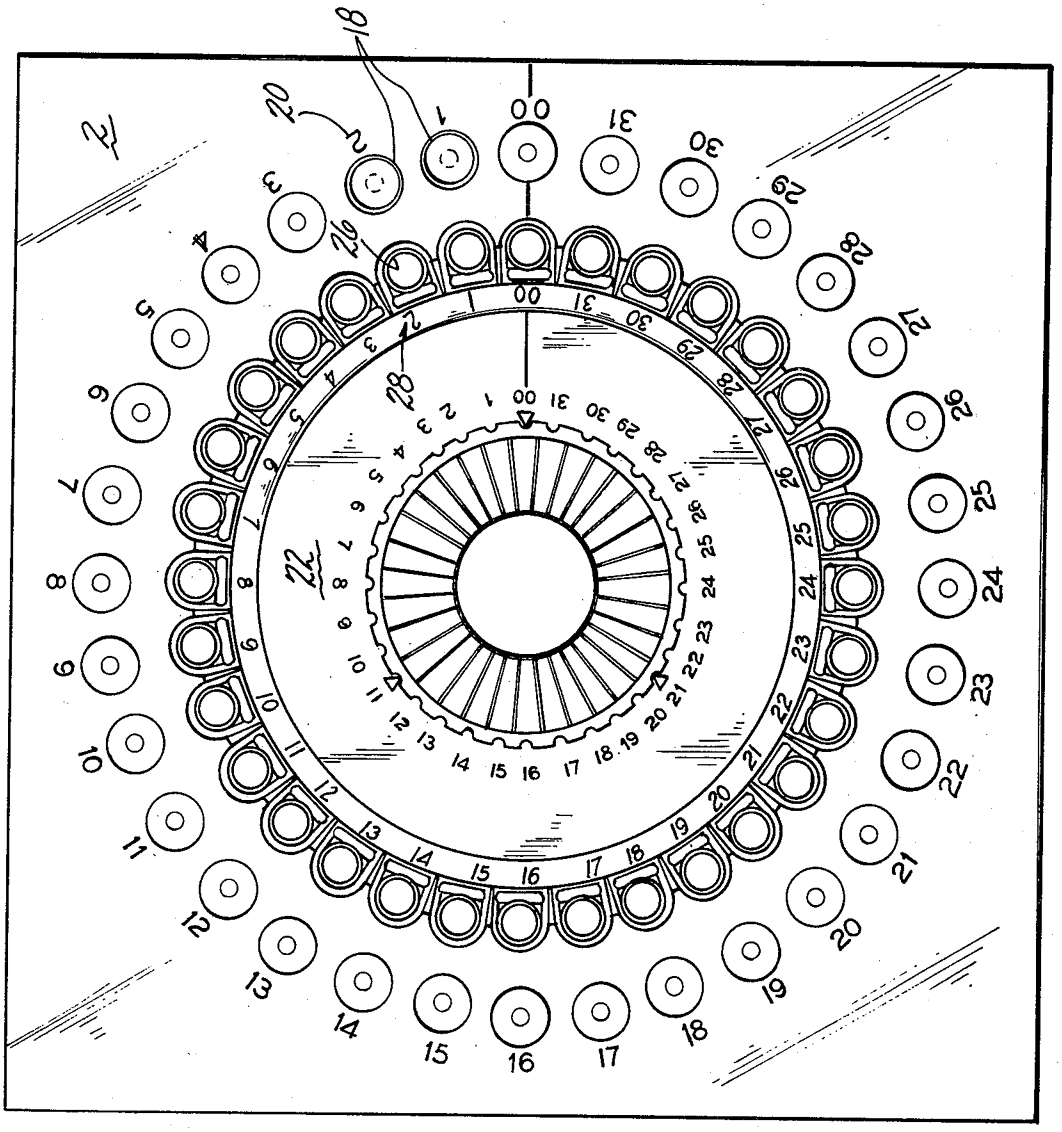
FIG. 3 is a top plan view showing the rack and circular part of the instrument and the manner in which the specimen receptacles and bulk specimen tubes are positively paired.

Referring to FIG. 3, it will be noted that each receptacle 26 is associated with a numerical indicium 28 which matches the numerical indicium 20 associated with the bulk specimen tube 18. The carousel 22 is merely rotated in the rack 2 until the numbers on the carousel 22 and rack 2 match.

It will be understood that the bulk specimen tubes contain whatever biological fluids that are being tested, with a sample from each patient being deposited in a respective specimen tube. The tubes are placed in the transfer rack in the respective numbered tube holders and the patients' names and the respective numbers are matched and recorded. The carousel is then placed in the rack, its specimen receptacles being empty, and it is rotated so that the specimen receptacle numbers and specimen tube holder numbers match. It will are readily apparent that, once proper alignment is achieved, the specimen samples may be transferred from the bulk specimen tubes to the specimen receptacles with virtually no chance of correlation.

I claim:

1. A specimen transfer rack for use in transferring fluid specimens from a plurality of bulk specimen tubes to a plurality of specimen receptacles carried on a part of a specimen analyzing instrument, said rack comprising:

(a) support means for releasably holding and supporting the part of the specimen analyzing instrument; and (b) a plurality of specimen tube holders equiangularly disposed about said support means whereby each of said tube holders is disposed opposite to and paired with a respective one of the specimen receptacles on the part of the specimen analyzing instrument.

2. The specimen transfer rack of claim 1, wherein said support means is circular in configuration, and said specimen tube holders are disposed about the periphery of said support means.

3. The specimen transfer rack of claim 1, wherein said specimen tube holders are associated with consecutive numerical indicia printed on said rack.

4. A specimen transfer rack comprising:

(a) planar means forming a flat upper surface on said rack;

(b) means forming a circular support centrally of said planar means for releasably holding a circular receptacle-carrying part of an analyzing instrument; and (c) a plurality of specimen tube holding means disposed on said planar means, said specimen tube holding means being radially outwardly offset from and equiangularly disposed about the periphery of said circular support.

5. The specimen transfer rack of claim 4, wherein said specimen tube holding means are associated with consecutive numerical indicia printed on said planar means.

6. In combination with a part of a specimen analyzing instrument which instrument part includes a generally circular member having a plurality of specimen receptacles equiangularly disposed about the periphery of said circular member, a specimen transfer rack having support means for releasably receiving and supporting said circular member, said specimen transfer rack further comprising a plurality of specimen tube supports disposed radially outwardly of and equiangularly about the periphery of said circular member, the number of specimen tube supports equalling the number of specimen receptacles with each of said specimen tube supports being disposed opposite to and paired with a respective one of said receptacles.

7. The combination of claim 6, wherein each of said receptacles and said specimen tube supports has associated therewith consecutive numerical indicia for pair matching of specimen receptacles and specimen tubes.

* * * * *